(12) United States Patent
Cameron et al.

(10) Patent No.: US 7,629,884 B2
(45) Date of Patent: Dec. 8, 2009

(54) SYSTEM, DEVICE AND METHOD OF PROVIDING LOCATION BASED, EMERGENCY AND SERVICE CALL AND INVENTORY INFORMATION

(75) Inventors: Michael Cameron, McKinney, TX (US);
Sidney Weatherford, Richardson, TX (US)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 306 days.

(21) Appl. No.: 11/780,692

(22) Filed: Jul. 20, 2007

(65) Prior Publication Data

US 2009/0021425 A1    Jan. 22, 2009

(51) Int. Cl.
*G08B 1/08* (2006.01)

(52) U.S. Cl. .................. 340/539.18; 455/404.2

(58) Field of Classification Search ............ 340/539.18, 340/539.1, 539.13; 455/404.2, 456.1, 457
See application file for complete search history.

(56) References Cited

U.S. PATENT DOCUMENTS

| | | | | |
|---|---|---|---|---|
| 6,205,203 | B1* | 3/2001 | Gorman et al. | 340/539.1 |
| 6,747,555 | B2* | 6/2004 | Fellenstein et al. | 340/539.18 |
| 7,091,851 | B2* | 8/2006 | Mason et al. | 340/539.13 |
| 2006/0208888 | A1* | 9/2006 | Patel et al. | 340/539.18 |
| 2007/0103294 | A1* | 5/2007 | Bonecutter et al. | 340/539.18 |
| 2007/0194893 | A1* | 8/2007 | Deyoe | 340/539.18 |
| 2007/0194912 | A1* | 8/2007 | Lee et al. | 340/539.18 |
| 2008/0001733 | A1* | 1/2008 | Pinder | 340/539.18 |

* cited by examiner

*Primary Examiner*—John A Tweel, Jr.
(74) *Attorney, Agent, or Firm*—Michael G. Cameron

(57) ABSTRACT

A system for providing location based, event and inventory information having a first terminal coupled to a database correlating address information to location based coordinate information, said first terminal adapted to transmit said location based coordinate information and a second terminal adapted to receive the location based coordinate information, automatically input such location based coordinate information into a map display and display a map including the address that correlates to said location based coordinate information.

21 Claims, 4 Drawing Sheets

SYSTEM, DEVICE AND METHOD OF PROVIDING LOCATION BASED, EMERGENCY AND SERVICE CALL AND INVENTORY INFORMATION

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND OF THE INVENTION

The present invention relates to dispatch systems coupled to wireless, global positioning satellite (GPS) and radio frequency identification (RFID) systems. More particularly, and not by way of limitation, the present invention is directed to a dispatch system and method for providing location based, emergency and service call and inventory information to first responders or service companies.

When an emergency arises, a call is usually made to an emergency dispatch center. The dispatcher then alerts the first responders, such as police, fire services and/or ambulance services, of the need for help, via two-way radio. The initial call is made, for example, in the United States, using the 911 system. The dispatcher alerts the applicable first responder of the emergency by transmitting, via wireless analog or digital voice (e.g., using an APCO 25 compliant system), the address of the emergency. Typically, a paper grid map is used to help pinpoint the location of the emergency. In the Dallas-Fort Worth, Tex. area, such grid map is usually the proprietary Mapsco system. Alternatively, a first responder can take the transmitted address and input the address into a GPS receiver in order to be directed to the emergency by the GPS. Either of these techniques is cumbersome and time consuming.

Alternatively, when a non-emergency event arises, such as the need for the repair of an appliance in a home or business, a telephone call is usually made to a service company. The call is then typically routed to a dispatch center. The dispatcher obtains information from the caller such as the manufacturer and model number of the product in need of repair and the problem with the product. The dispatcher then sends this information to a repair branch near the caller. Based on the information provided by the caller, a check of parts which will likely be needed for the repair is made. For example, if the call is in relation to an appliance, the part needed may be a replacement microprocessor board, motor or heating element unique to the particular appliance make and model. These parts may be located in a repair van, the local branch warehouse or at a central warehouse. However, even if the part is located in a repair van near the caller, the logistics of conventional dispatch systems are unable to quickly dispatch the repair van to the caller. Rather, the caller must often wait days or weeks for a service call when all of the resources needed to accomplish the repair are located nearby. Hence, current dispatch practices are cumbersome and time consuming.

It would be advantageous to have a system, device and method for providing location, event and inventory based information that overcomes the disadvantages of the prior art. The present invention provides such a system and method.

BRIEF SUMMARY OF THE INVENTION

A first embodiment of the present invention provides location based information, such as GPS coordinates, over a communications channel of a wireless infrastructure from a dispatch center having at least a dispatch terminal and dispatch database coupled to the wireless infrastructure, to a mobile terminal having a GPS receiver integral or coupled thereto that is adapted to receive, and automatically input, the location based information from the dispatch center into the GPS receiver without the intervention of the GPS user. Directions from the then present location of the GPS to the location which has been automatically inputted into the GPS can then be automatically mapped on the GPS of the mobile terminal. In the context of dispatching first responders, additional information can be entered into the dispatch system by a dispatcher, such as emergency codes correlated to the type of emergency and the scope of the emergency. For example, if the emergency is a multiple car accident, then the code entered by the dispatcher via the dispatch terminal would cause the dispatch system to dispatch multiple first responders to the location.

A second embodiment of the present invention provides radio frequency identification (RFID) data related to inventory, tools, equipment or supplies (referred to collectively as inventory) within or available to a dispatched unit, from an RFID reader proximate the dispatched unit which is coupled to the mobile terminal, over the wireless system to the dispatch system. This inventory information, in the form of inventory data, is available to the dispatch system where it is combined with the location based information, such as GPS coordinates, when determining which unit to dispatch on the service call. The inventory information is obtained from RFID tags affixed, or correlated, to each unit of inventory. An RFID reader integral, or coupled to the mobile terminal, is adapted to poll the area around the RFID reader to ascertain the parts within the area, such as in the back of a van, ambulance or fire truck. The data can be obtained by the RFID reader based on a command sent from the dispatch system over the wireless infrastructure to the mobile terminal on a contemporaneous basis, or can be automatically obtained by the RFID reader from time to time and stored within a memory of the RFID reader. Thereafter, the inventory data which has been, or is sent, over the wireless infrastructure, is available to the dispatch system to be available when a service request is made. In this manner, before directions from the location of the mobile terminal/GPS to the caller location are automatically inputted into the GPS, a query can be made by the dispatch system to determine if a unit to be dispatched has the inventory necessary for the service call. In the event the necessary inventory is not within the nearest unit, the dispatch system can query the next closest unit. In the context of dispatching first responders, additional information can be obtained from the RFID tags as to the supplies and equipment within the first responder's unit. In this way, the nearest first responder having the supplies necessary for the call can be dispatched to the emergency.

BRIEF DESCRIPTION OF THE SEVERAL VIEWS OF THE DRAWING

In the following section, the invention will be described with reference to exemplary embodiments illustrated in the figures, in which.

DETAILED DESCRIPTION

Figure 1:
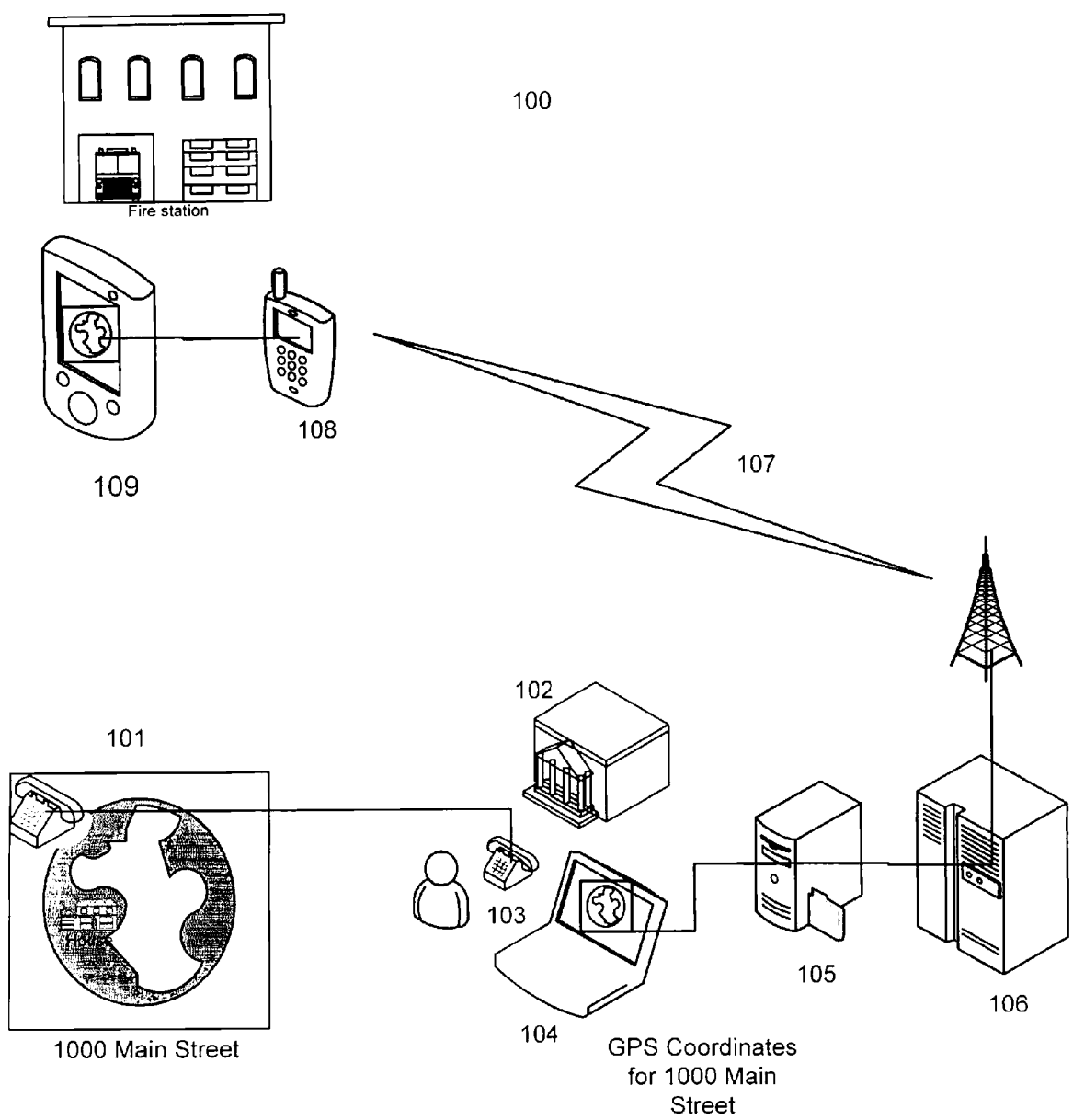
FIG. 1 is a block diagram of the system of the first embodiment of the present invention.

The present invention comprises a system, device and method for providing location based, event and inventory information, such as GPS coordinates, emergency or service codes and RFID data, from a dispatch system over a communications channel of a wireless infrastructure to a terminal, such as a mobile terminal/GPS receiver, that is adapted to receive, and automatically input, the location based information into the terminal's GPS receiver without the intervention of the GPS user. Directions from the, then present, location of the terminal to the location automatically inputted from the dispatch system can then be automatically mapped on a map display of the terminal.

An embodiment of the present invention in a dispatch context is described herein. For example, a dispatch system of the present invention includes a first terminal coupled to a database adapted to receive a first address and event information which is obtained and inputted by a dispatcher. The first address is correlated to a first set of location based data and the event information is correlated to an event data. Note that the first terminal is typically located away from the first address—that is the first address is not the location of the first terminal. The first terminal is usually located at a dispatch center whereas the first address is the location of the emergency or service call. The dispatch system also includes a second terminal having a map display unit adapted to receive a second set of location based data from a location data system based on a second address, the second terminal adapted to transmit such second set of location based data over a communication channel to the first terminal. Here, the second address is the location of the second terminal. The first terminal is adapted to maintain the second set of location based data in a memory and depending on qualifying criteria of the second set of location based data and the event data the first terminal will transmit the first set of location based data and event data to the second terminal. For example, the qualifying criteria can be the distance represented by the two sets of GPS coordinate data and the type of event that a responder is to be dispatched. Assuming the qualifying criteria is met with respect to the second terminal, and the first set of GPS coordinate data and event data is sent to the second terminal, then the second terminal automatically inputs such location based data into its display unit so as to display a map including the first address that correlates to the first set of location based data. Preferably, the first set and second set of location based data is GPS coordinate data. The event information is information related to the type and scope of an emergency or service call. The dispatch system can further include an RFID reader coupled to the second terminal and adapted to obtain inventory data representing inventory information from RFID tags near the second terminal, the second terminal being able to transmit the inventory data over the communications channel to the first terminal. The first terminal is then able to correlate the inventory data with the event data, and, if a positive correlation is obtained, the first terminal then sends the first set of location based data and event data to the second terminal. As noted, the first terminal and second terminal inter-communicate over a communication channel of a wireless infrastructure adapted to facilitate the transmission and reception of the information from the first terminal to the second terminal over the communication channel, wherein the wireless infrastructure is one selected from the group consisting of a simplex system, a semi-duplex system, a duplex system, a trunked system, an analog system, a digital system, a GSM system, a CDMA system, a 3G system, and a 4G system. The first terminal can be located at a dispatch center and the second terminal can be a remote GPS transceiver/display.

The present invention further includes the terminal used in the dispatch system. The terminal has a receive unit, a GPS unit coupled at least to the receive unit, a transmit unit coupled at least to the GPS unit, and an RFID unit coupled at least to the transmit unit. The GPS unit generates terminal GPS coordinate data which is correlated to the location of the terminal and the receiver unit receives and demodulates modulated remote GPS coordinate data representing a location or address away or remote from the terminal. The remote GPS coordinate data is obtained from a wireless system over a communication channel. The GPS unit is able to display a map based on the remote GPS coordinate data showing the location of the address correlated to the remote GPS coordinate data and a route from an address based on the terminal GPS coordinate data to an address based on the remote GPS coordinate data. The RFID reader obtains inventory data representing inventory information near the terminal. The transmit unit transmits the proximate GPS coordinate data and inventory data over a communication channel for use by a dispatch system. The terminal can be used in combination with a base station having a central database wherein the transmit unit is adapted to obtain from the GPS unit, and transmit from time to time, the terminal GPS coordinate data to the base station. The system also includes a plurality of terminals having similar functionality, with the plurality of slave terminals being coordinated by at least one master terminal coupled to the base station of the central database. The master terminal is able to maintain near contemporaneous GPS coordinate data for each slave terminal. The dispatch system further includes a plurality of such terminals, with at least one master terminal located at a dispatch center. The dispatcher at a master terminal can thus receive a plurality of address information for a variety of events occurring away from the dispatch center, correlate the address information to a plurality of respective remote GPS coordinate data, and transmit the each of the remote GPS coordinate data to one of the plurality of terminals based on the distance from a specific remote GPS coordinate data to a specific slave terminal.

The present invention also includes the method of providing location data and event information to a responder, having the steps of entering an address into a first terminal and obtaining a first set of GPS system coordinate data for the address, entering event information related to an event into the first terminal and obtaining event data, obtaining a second set of GPS coordinate data correlated to a second terminal coupled to a GPS receiver/map display, and depending on the distance between the first set of GPS coordinate data and second set of GPS coordinate data, and the nature of the event data, transmitting the first set of GPS coordinate data and event data over a communication channel of a wireless system to the second terminal. The method further includes automatically inputting the first set of GPS coordinate data into the GPS receiver/map display of the second terminal, and displaying the address correlated to the first set of GPS coordinate data on the map display unit of the GPS receiver/map display of the second terminal. The method further includes the steps of using an RFID unit to obtain inventory data related to inventory information around the second terminal, and transmitting by the second terminal to the first terminal over the communication channel of the wireless system, inventory data from time to time, wherein the inventory information comprises parts, tools, equipment or supplies tagged with RFID tags.

However, the present invention is not limited to the foregoing contexts. For example, a mobile terminal (e.g., a smart phone) can be used to (1) retrieve GPS coordinates representing an address from a database, and (2) send the coordinates to a second, receiving mobile terminal unit having an integrated GPS receiver/display, whereupon an application on the receiving mobile terminal can then retrieve the received data from the mobile terminal and automatically input the data into the integrated GPS receiver/display. RFID reader functionality can likewise be made integral to the mobile terminal or smart phone.

To illustrate a first embodiment of the present invention, reference is made to FIG. 1. In a dispatch system 100, a telephone call is made from a telephone 101 to a dispatch center 102, alerting the dispatcher using a dispatch center telephone 103 of an emergency. During the call, the caller communicates a physical address to the dispatcher. The dispatcher enters the address into dispatch terminal 104 of a dispatch server 105. Alternatively, if the call is made from a wire-line telephone, an address may be automatically associated with the telephone number. A database application within the database server 105 obtains GPS coordinates that are correlated to the address, using, for example, a look-up table. These GPS coordinates are encoded, e.g., in a data packet, and then modulated, to facilitate their transmission via a wireless infrastructure 106, over a communication channel 107, to a terminal 108 such as a wireless transceiver and GPS receiver/map display 109. At terminal 108, the GPS coordinate data is demodulated and decoded and then automatically inputted into the GPS receiver portion of the GPS receiver/map display 109 to be displayed on the map display portion of the GPS receiver/map display 109. In this way, a map of the address, and surrounding streets/waypoints can be displayed on the map display portion of the GPS receiver/map display 109. Algorithms within the GPS receiver/map display 109 can then be used to create a moving map of the shortest route from the terminal 108/GPS receiver/map display 109 to the address represented by the GPS coordinates. As noted below, dispatch server 105 is further adapted to receive GPS coordinate data over communication channel 107 relating to the location of the terminal 108, so that the dispatch system has a real time view of the location of each first responder.

Terminal 108 and GPS receiver/map display 109 can be separate, but coupled units or may be integrated into a single form factor. The wireless infrastructure 106 used to implement the communication channel 107 consists of antennas, base station transmitters, transceivers, base station controllers, and/or switching centers typical in a wireless system, such wireless system including, but not limited to a simplex system, semi-duplex system, duplex system, trunked system, analog system, digital system, GSM, CDMA, 3G, and/or 4G system.

In a further aspect of the first embodiment of the present invention, the GPS coordinates of all first responders, may be transmitted, from time to time, from each of their respective GPS receiver/map display 109 via terminal 108 over communication channel 107 to the wireless infrastructure 106 and stored in database server 105. In this way, the GPS coordinates related to the address can then also be matched against the GPS coordinates of the address of the emergency. An algorithm is then used to find the nearest first responders to the address and the alert is only sent to those first responders. A first responder who is otherwise the nearest first responder to the address of the emergency can indicate or flag that it is out of service. In that event, the next closest first responder that is in service can be notified of the emergency. In a further embodiment, the information about the location of all the first responders can be communicated to each terminal/GPS receiver/map display. In the context of dispatching first responders, additional information can be entered into the dispatch system by a dispatcher, such as emergency codes correlated to the type of emergency and the scope of the emergency. For example, if the emergency is a multiple car accident, then the code entered by the dispatcher via the dispatch terminal into the dispatch system would cause the system to dispatch multiple first responders to the location.

Figure 2:
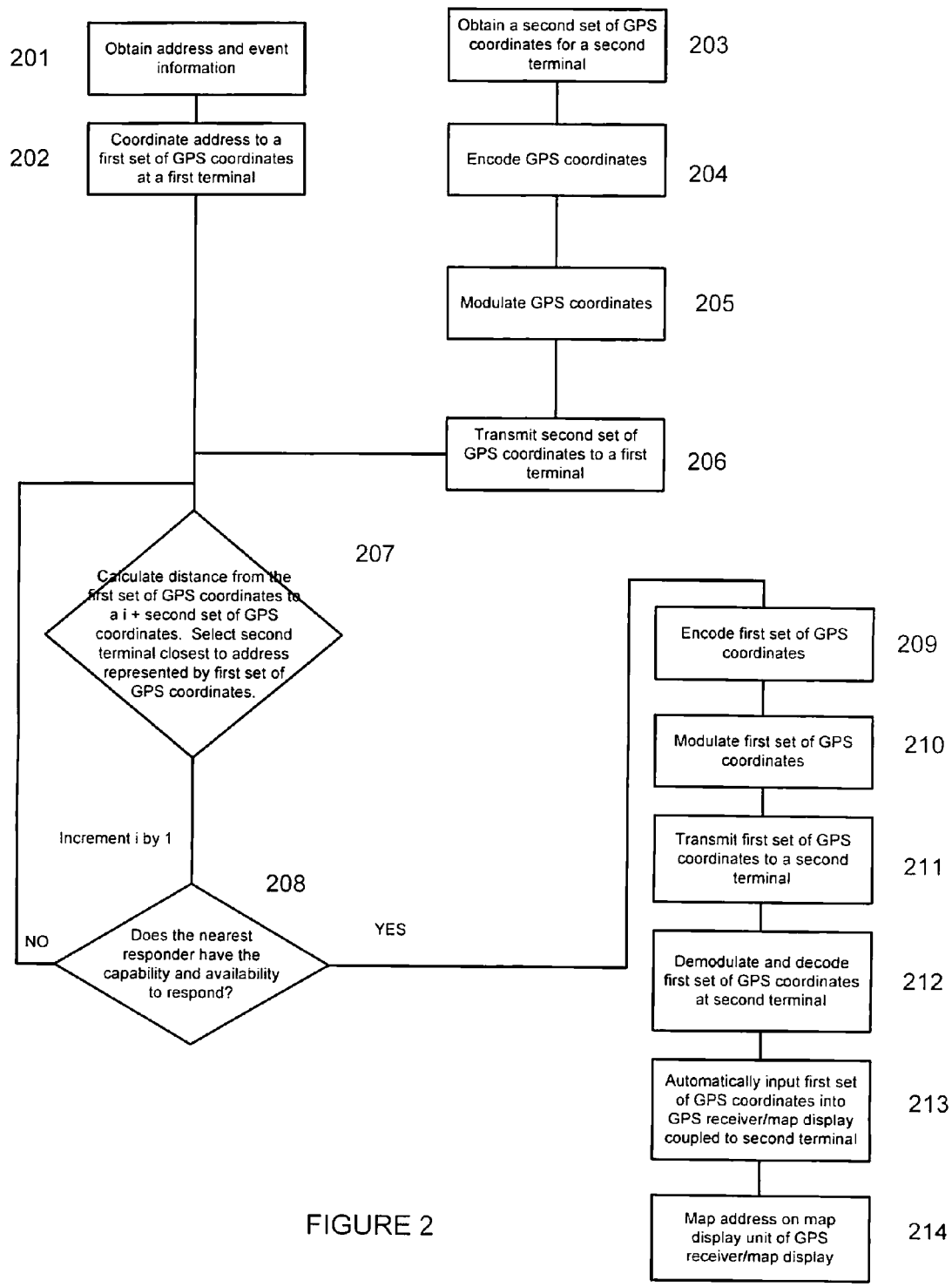
FIG. 2 is a flow chart of the method of the first embodiment of the present invention.

FIG. 2 is a flow chart 200 of the method of the first embodiment of the present invention. In step 201, an emergency call address and emergency information is obtained. In step 202, the emergency call address is correlated to a first set of GPS coordinates at a first terminal. Meanwhile, in steps 203-206, a second set of GPS coordinates correlated to the location of the second terminal, i.e., of a first responder, are made available or obtained by a first terminal, and are updated from time to time. In step 207, the first set of GPS coordinates are compared to all available second sets of GPS coordinates, e.g., from all available first responders, and the distance from each first responder to the emergency call address is calculated. In step 208, the emergency information is compared to the capabilities of the nearest first responder. If there is a match, meaning the nearest first responder has the capability to respond to the emergency, then in step 209, the first set of GPS coordinates are encoded and in step 210, the encoded first set of GPS coordinates are modulated. In step 211, the first set of GPS coordinates are transmitted to a second terminal associated with the nearest first responder. If the nearest first responder does not have the capability to respond, for example, as determined in step 208, then in step 208, a counter is incremented which causes the next nearest first responder to be interrogated as to its capability in step 208. In step 212, the first set of GPS coordinates are demodulated and decoded by the second terminal of the first responder to be dispatched. In step 213, the GPS coordinates are automatically inputted into a GPS receiver/map display which is coupled to the second terminal. In step 214, the emergency call address correlated to the first set of GPS coordinates is obtained from a database and displayed on the map display portion of the GPS receiver/map display of the second terminal.

Figure 3:
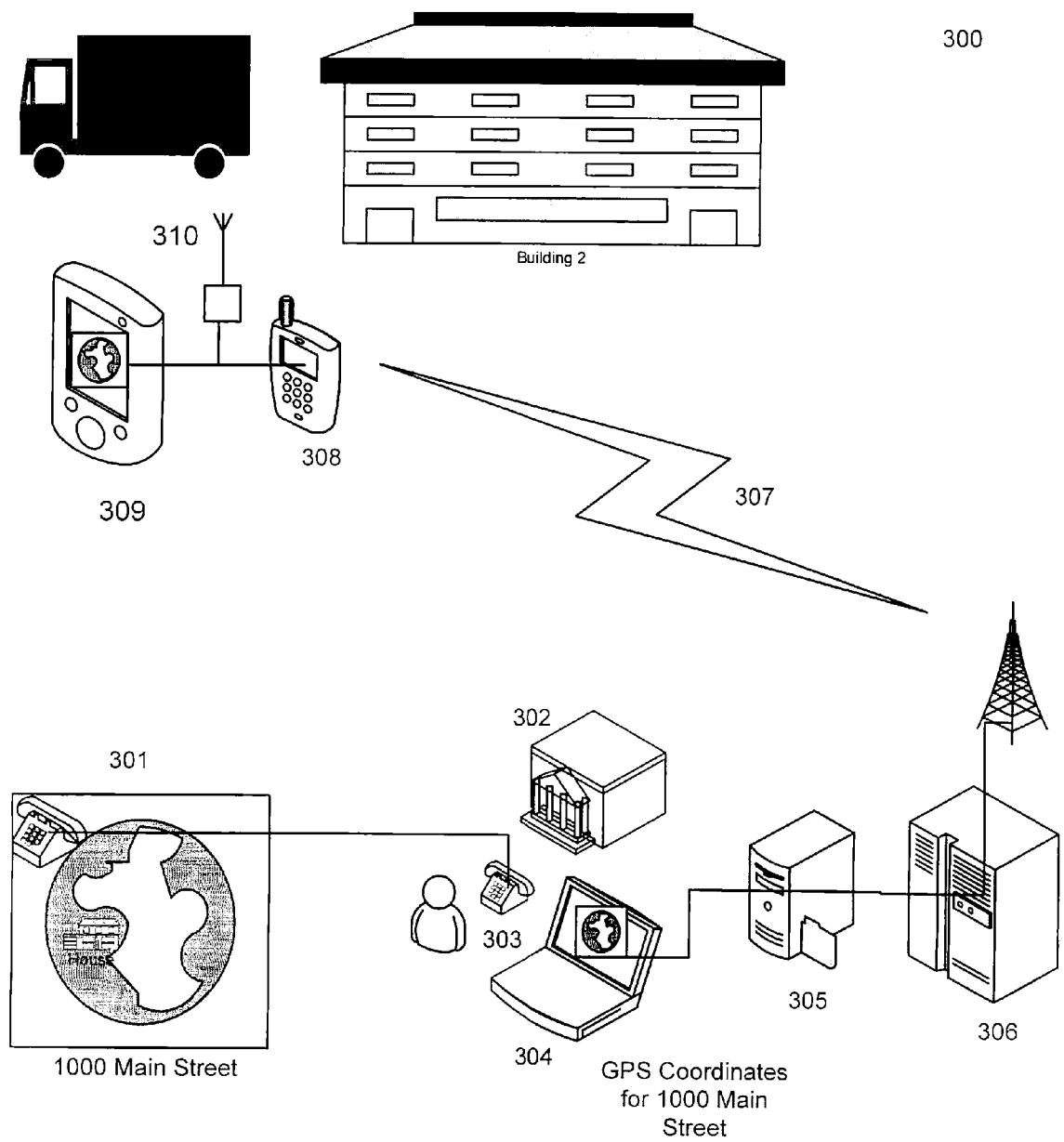
FIG. 3 is a block diagram of the second embodiment of the system of the present invention.

To illustrate a second embodiment of the present invention, reference is made to FIG. 3. In a dispatch system 300, a telephone call is made from a telephone 301 to a dispatch center 302, informing the dispatcher using a dispatch center telephone 303 of the need for a service call. During the call, the caller communicates a physical address to the dispatcher. The dispatcher enters the address into a dispatch terminal 304 which is coupled to dispatch server 305 having a database application that queries a database for a first set of GPS coordinates that are correlated to the address. The dispatcher enters into the dispatch terminal 304 information concerning the nature of the call, such as the make and model of the product needing repair and the nature of the problem, referred to herein as service information. The service information entered into the dispatch terminal 304 causes the database server 305 to return a list of parts, tools, equipment and the like (referred to as inventory) needed for the service call.

An RFID reader 310 is located within or proximate each service vehicle within a fleet that is available to be dispatched, and is coupled to a second terminal 308. The RFID reader 310 can be separate but coupled to the second terminal 308 or can be integrated within the form factor of the second terminal 308. The RFID reader 310 is adapted to sense RFID tags (not shown) attached to the inventory included within each service vehicle available to be dispatched. An updated inventory list for each unit of the fleet is either sent over a communication channel 307, from time to time, to the dispatch server 305 or is retained within a memory of the RFID reader 310/second terminal 308, and is reported to the dispatch server over communication channel 307 in response to a command to the RFID reader 310/second terminal 308 from the dispatch server 305. The dispatch system 300 thus has, or can easily obtain, information regarding what inventory is in which service vehicle.

The GPS coordinates are encoded, e.g., in a data packet, and then modulated, to facilitate their transmission via a wireless infrastructure 306, over the communication channel 307, to a wireless transceiver 308 and GPS receiver/map display 309 to the nearest service vehicle that has the inventory necessary to complete the service call. At the second terminal 308/GPS receiver/map display 309, the GPS coordinate data is demodulated and decoded and then automatically inputted into the GPS receiver portion of the GPS receiver/map display 309 to be displayed on the map display portion of the GPS receiver/map display 309. In this way, a map of the address and surrounding streets/waypoints can be displayed on the map display portion of the GPS receiver/map display 309. Algorithms within the GPS receiver/map display 309 can then be used to create a moving map of the shortest route from the, then present, location of the GPS receiver/map display 309 to the address represented by the GPS coordinates. Wireless transceiver 308 and GPS receiver/map display 309 can be separate but coupled units or may be integrated into a single form factor. The wireless infrastructure 306 used to implement the communication channel 307 consists of antennas, base station transmitters, transceivers, base station controllers, and/or switching centers typical in a wireless system, such wireless system including, but not limited to a simplex system, semi-duplex system, duplex system, trunked system, analog system, digital system, GSM, CDMA, 3G, and/or 4G system.

As noted above, the GPS coordinates of all units in a fleet available to be dispatched, may be transmitted, from time to time, from each of their respective GPS receiver/map display 309 via terminal 308 over communication channel 307 to the wireless infrastructure 306 and stored in a database server of the dispatch server 305. In this way, the GPS coordinates related to the address can then also be matched against the GPS coordinates of the address of the service call location. An algorithm is then used to find the nearest service vehicle to the address and the service call alert is only sent to that service vehicle. A service vehicle that is otherwise the nearest service vehicle to the address of the service call can indicate or flag that it is out of service. In that event, the next closest service vehicle that is in service and has the necessary inventory can be notified of the service call. In a further embodiment, the information about the location of all the service vehicles can be communicated to each GPS receiver/map display of the fleet.

Figure 4:
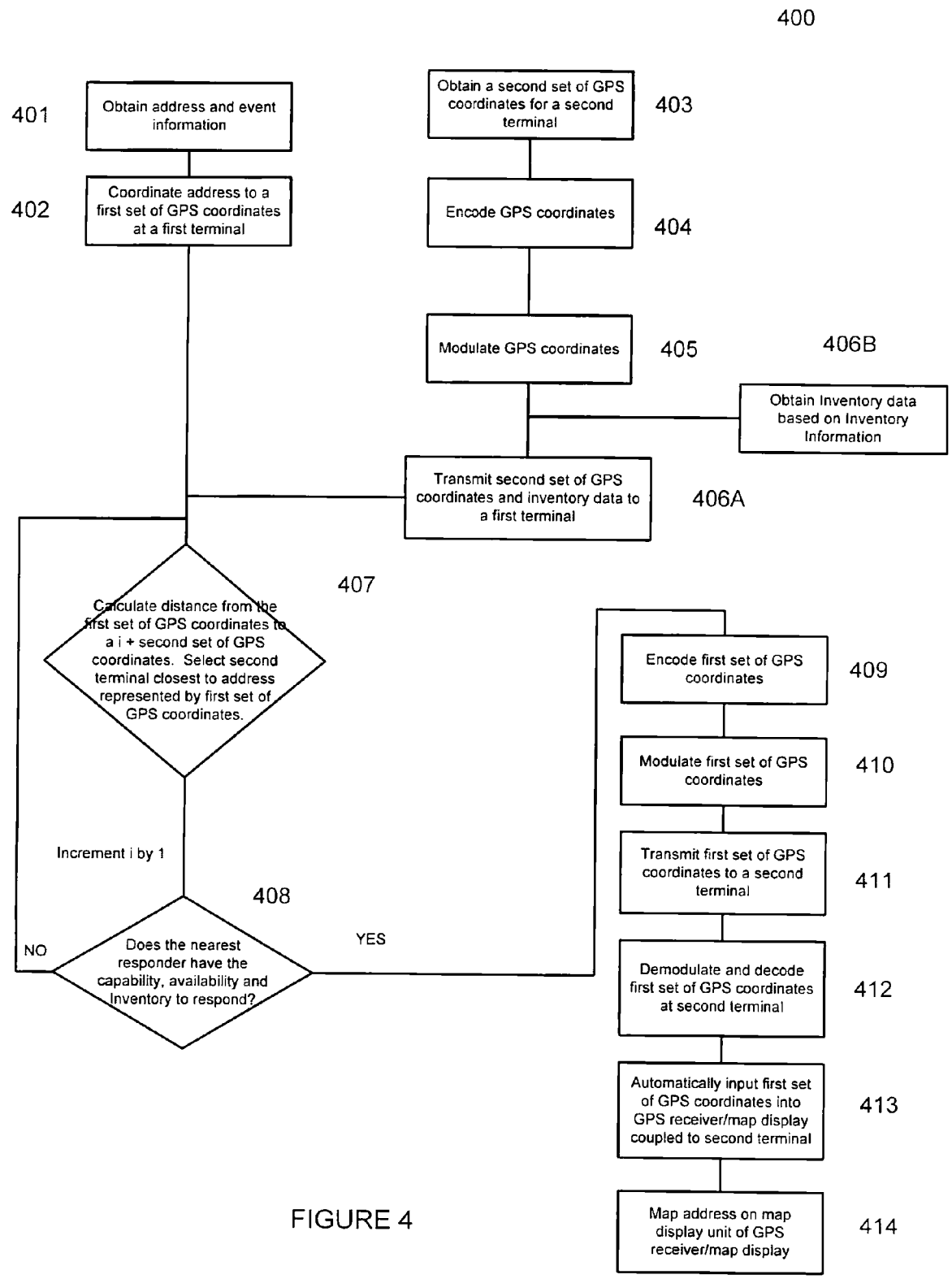
FIG. 4 is a flow chart of the second embodiment of the method of the present invention.

FIG. 4 is a flow chart 400 of the method of the second embodiment of the present invention. In step 401, a service call address and information is obtained. In step 402, the service call address is correlated to a first set of GPS coordinates at a first terminal. Meanwhile, in steps 403-406A, a second set of GPS coordinates correlated to the location of the second terminal, i.e., of a service repair vehicle, are made available or obtained by the first terminal and are updated from time to time. In step 406B, inventory data representing inventory information obtained from, e,g., an RFID reader, is obtained by the second terminal. In step 407, the first set of GPS coordinates are compared to all available second sets of GPS coordinates, e.g., from all available service vehicles, and the distance from each service vehicle to the service call address is calculated. In step 408, the service call and inventory information is compared to the capabilities/inventory of the nearest service vehicle. If there is a match, meaning the nearest service vehicle has the capability/inventory to respond to the service call, then in step 409, the first set of GPS coordinates are encoded and in step 410, the encoded first set of GPS coordinates are modulated. In step 411, the first set of GPS coordinates are transmitted to a second terminal associated with the nearest service vehicle. If the nearest service vehicle does not have the capability to respond, for example, as determined in step 408, then in step 408, a counter is incremented which causes the next nearest service vehicle to be interrogated as to its capability in step 408. In step 412, the first set of GPS coordinates are demodulated and decoded by the second terminal of the first responder to be dispatched. In step 413 the GPS coordinates are automatically inputted into a GPS receiver/map display which is coupled to the second terminal. In step 414, the emergency call address correlated to the first set of GPS coordinates is obtained from a database and displayed on the map display portion of the GPS receiver/map display of the second terminal.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A dispatch system, comprising:
   a first terminal coupled to a database adapted to receive a first address and event data and to correlate the first address to a first set of location based data, wherein the first terminal is located remote from the first address;
   a second terminal having a map display unit the second terminal adapted to receive a second set of location based data from a location system based on the location of the second terminal, the second terminal adapted to transmit such second set of location based data over a communication channel to the first terminal;
   the first terminal adapted to maintain the second set of location based data in a memory,
   dependent on the second set of location based data and the event data meeting certain criteria, the first terminal adapted to transmit the first set of location based data and event data to the second terminal; and
   the second terminal further adapted to automatically input such location based data into the display unit adapted to display a map including the first address that correlates to said first set of location based data.

2. The dispatch system of claim 1, wherein the first set and second set of location based data is global positioning satellite (GPS) coordinate data.

3. The dispatch system of claim 1, wherein the event information comprises information related to the type and scope of an emergency or service call.

4. The dispatch system of claim 1, further comprising a short range radio frequency identification (RFID) reader coupled to the second terminal and adapted to obtain inventory data representing inventory information from RFID tags proximate the second terminal, the second terminal further adapted to transmit the inventory data to the first terminal.

5. The dispatch system of claim 4, wherein the first terminal is adapted to correlate the inventory data with the event data, and, if a positive correlation is obtained, the first terminal adapted to transmit the first set of location based data and event data to the second terminal.

6. The dispatch system of claim 1, further comprising a wireless infrastructure adapted to facilitate the transmission and reception of the global positioning satellite (GPS) coordinate information from the first terminal to the second terminal over the communication channel.

7. The dispatch system of claim 6, wherein the wireless infrastructure comprises one or more of a simplex system, a semi-duplex system, a duplex system, a trunked system, an analog system, a digital system, a GSM system, a CDMA system, a 3G system, and a 4G system.

8. The dispatch system of claim 1, wherein the first terminal is located at a dispatch center and the second terminal is a remote global positioning satellite (GPS) transceiver/display.

9. A terminal, comprising:
a receive unit;
a global positioning satellite (GPS) unit coupled at least to the receive unit;
a transmit unit coupled at least to the GPS unit;
a radio frequency identification (RFID) unit coupled at least to the transmit unit;
the GPS unit adapted to generate terminal GPS coordinate data which is correlated to the location of the terminal;
the receiver unit adapted to receive and demodulate modulated remote GPS coordinate data representing an location or address remote from the terminal, said remote GPS coordinate data being obtained from a wireless system over a communication channel;
the GPS unit being adapted to display a map based on the remote GPS coordinate data showing the location of the address correlated to the remote GPS coordinate data and a route from an address based on the terminal GPS coordinate data to an address based on the remote GPS coordinate data;
the RFID reader adapted to obtain inventory data representing inventory information proximate the terminal;
the transmit unit adapted to transmit the proximate GPS coordinate data and inventory data over a communication channel for use by a dispatch system.

10. The terminal of claim 9, in combination with a base station having a central database wherein the transmit unit is adapted to obtain from the GPS unit, and transmit from time to time, the terminal GPS coordinate data to the base station.

11. The terminal of claim 10, in combination with at least one wireless system over which the terminal and base station intercommunicate, wherein the wireless system comprises one or more of a simplex system, a semi-duplex system, a duplex system, a trunked system, an analog system, a digital system, a GSM system, a CDMA system, a 3G system, and a 4G system.

12. The terminal of claim 11, in combination with a plurality of slave terminals having similar functionality, said plurality of slave terminals being coordinated by at least one master terminal coupled to the base station of the central database, said master terminal adapted to maintain near contemporaneous GPS coordinate data for each slave terminal.

13. The terminal of claim 12, wherein the at least one master terminal is located at a dispatch center adapted to receive a plurality of address information remote from the dispatch center, correlate the address information to a plurality of respective remote GPS coordinate data, and transmit said remote GPS coordinate data to one of the plurality of terminals based on the distance from a specific remote GPS coordinate data to a specific slave terminal.

14. A method of providing location data and event information to a responder, comprising the steps of:
entering an address into a first terminal and obtaining a first set of global positioning satellite (GPS) system coordinate data for said address;
entering event data in to the first terminal;
obtaining a second set of GPS coordinate data correlated to a second terminal coupled to a GPS receiver/map display;
depending on the distance between the first set of GPS coordinate data and second set of GPS coordinate data, and the nature of the event data, transmitting said first set of GPS coordinate data and event data over a communication channel of a wireless system to the second terminal;
automatically inputting said first set of GPS coordinate data into the GPS receiver/map display of the second terminal;
displaying the address correlated to the first set of GPS coordinate data on the map display unit of the GPS receiver/map display of the second terminal.

15. The method of claim 14, further comprising the step of mapping the shortest route from the location of the second terminal based on the second set of GPS coordinate data to the address represented by the first set of GPS coordinate data transmitted from the first terminal over a communication channel of a wireless system.

16. The method of claim 13, further comprising the steps of:
using a radio frequency identification (RFID) unit to obtain inventory data related to inventory information proximate the second terminal; and
transmitting by the second terminal to the first terminal over the communication channel of the wireless system, inventory data from time to time.

17. The method of claim 16, wherein the inventory information comprises parts, tools, equipment or supplies tagged with RFID tags.

18. The method of claim 15, wherein the first terminal is located at a dispatch center and the event information relates to the nature and scope of an emergency event.

19. The method of claim 15, wherein the first terminal is located at a dispatch center and the event information relates to the nature and scope of a service call.

20. The method of claim 15, wherein the first terminal and second terminal inter-communicate over a wireless system comprising one or more of a simplex system, a semi-duplex system, a duplex system, a trunked system, an analog system, a digital system, a GSM system, a CDMA system, a 3G system, and a 4G system.

21. A method of responding to an event, comprising the steps of:

responsive to notification of an event, a first terminal determining the physical location of the event and storing received pertinent information regarding the event;

determining from a list of one or more remote responders a best responder that is capable of handling the event, wherein location of the remote responders and a list of each of the remote responders' available tools and supplies are automatically available to the first terminal so as to accurately determine the best responder;

automatically selecting the best responder, with regard to the event, according to the best responder's current location and the best responder's available tools and supplies; and automatically sending the coordinates and details associated with the event to a second terminal associated with the best responder, wherein the coordinates of the event and the pertinent information regarding the event are displayed on a display coupled with the second terminal.

* * * * *